(12) United States Patent
Wang et al.

(10) Patent No.: US 10,336,841 B2
(45) Date of Patent: Jul. 2, 2019

(54) SELF SUPPORTED PHOSPHINIMINE CATALYST

(71) Applicant: NOVA Chemicals (International) S.A., Fribourg (CH)

(72) Inventors: Qinyan Wang, Calgary (CA); Savini Udara Suduweli Kondage, Endeavour (AU); Bradley Wade Funk, Calgary (CA); Amy Marie Baltimore, Calgary (CA)

(73) Assignee: NOVA Chemicals (International) S.A., Fribourg (CH)

(*) Notice: Subject to any disclaimer, the term of this patent is extended or adjusted under 35 U.S.C. 154(b) by 0 days.

(21) Appl. No.: 15/437,481

(22) Filed: Feb. 21, 2017

(65) Prior Publication Data

US 2017/0240673 A1    Aug. 24, 2017

(30) Foreign Application Priority Data

Feb. 29, 2016  (CA) ...................................... 2922156

(51) Int. Cl.
*C08F 210/16*    (2006.01)

(52) U.S. Cl.
CPC .................................. *C08F 210/16* (2013.01)

(58) Field of Classification Search
None
See application file for complete search history.

(56) References Cited

U.S. PATENT DOCUMENTS

| 4,325,849 A | 4/1982 | Rosen et al. |
| 4,923,833 A | 5/1990 | Kioka et al. |
| 5,684,097 A | 11/1997 | Palmroos et al. |
| 7,341,971 B2 | 3/2008 | Denifl et al. |

FOREIGN PATENT DOCUMENTS

| CA | 2704934 | * | 5/2010 | ................ C08F 2/12 |
| WO | 03/051934 A2 | | 6/2003 | |

* cited by examiner

*Primary Examiner* — Yun Qian
(74) *Attorney, Agent, or Firm* — Julie L. Heinrich

(57) ABSTRACT

In some embodiments provided herein is a self-supported phosphinimine single site catalyst having a molar ratio of Al from the activator (MAO) to the active metal in the catalyst from 5:1 to 30:1. The catalyst is prepared by precipitating an emulsion of the activated catalyst from a perfluoroalkane continuous phase resulting in spherical catalyst particles having a diameter typically from 5 to 200 μm.

13 Claims, 2 Drawing Sheets

SELF SUPPORTED PHOSPHINIMINE CATALYST

Embodiments disclosed herein relate to self-supported phosphinimine catalysts useful in gas phase or slurry phase polymerization.

Prior to the commercial introduction of metallocene type catalysts, the heterogeneity of catalysts such as chrome based catalyst and the Ziegler Natta catalyst contributed far more to the heterogeneity of the resulting polymer than the effects of the support. With the introduction of metallocene type catalysts (single site catalysts), the heterogeneity of the support may significantly contribute to the heterogeneity of the resulting polymer.

U.S. Pat. No. 4,923,833 issued May 8, 1990 to Kioka et al., assigned to Mitsui Petrochemical Industries, Ltd. teaches a number of methods to prepare a metallocene catalyst in the presence of an activator without a support such as silica. The second method described from line 62 of column 9 through line 45 of column 10 teaches forming a solution of MAO and a metallocene and adding to it a non-solvent for the MAO to precipitate the MAO and metallocene. The patent does not disclose catalysts containing a phosphinimine ligand nor does it disclosure the use of fluorinated hydrocarbons as a non solvent for the MAO and the catalyst.

There are a number of related patents in the name of Denifl et al., assigned to Borealis Technology Oy that disclose a method to prepare a catalyst without an external support (self supported catalyst). These patents are related to or derived from PCT/EPO02/14461 (such as U.S. Pat. No. 7,341,971 issued Mar. 11, 2008). The thrust of the disclosure is to metallocene type catalysts and there does not appear to be any disclosure of a catalyst containing a phosphinimine ligand. The reference teaches that an organic solution of catalyst and activator together with a surfactant are added to a liquid under conditions at which the liquid is a non solvent for the solution of activator and catalyst (i.e. an emulsion is formed). The resulting emulsion may then be subjected to conditions which cause the organic solvent to become miscible in the liquid. This phase change causes the catalyst particles formerly dispersed in the organic solvent to be precipitated from the liquid. The particles may then be recovered. In an embodiment of the patents, the catalyst is pre-polymerized prior to use in a commercial reactor.

The Borealis patents suggest the support can also have an adverse effect on the activity of the catalyst, on its polymerization behavior and on the properties of the end polymer (e.g. U.S. Pat. No. 7,341,971 Col. 1 lines. 58-62).

Phosphinimine containing catalysts are also know in the patent literature. There are a number of patents in the names of Stephan and Brown among others assigned to NOVA Chemicals Corporation and NOVA Chemicals International S.A. relating to the use of transition metal complexes containing a cyclopentadienyl type ligand and a phosphinimine ligand for use as a catalyst in the polymerization of ethylene and alpha olefins.

Surprisingly, applicants have found that by treating phosphinimine containing catalyst in accordance with the process described in the Borealis patents required very little amount of MAO activator to be a highly efficient catalyst understand gas phase polymerization conditions.

Some embodiments disclosed herein seek to provide a self-supported phosphinimine catalysts which may be useful in gas phase or slurry polymerization.

Some embodiments disclosed herein provide a spherical self-supported single site catalyst having a diameter from 5 to 200 μm comprising a catalyst of the formula

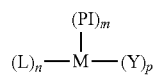

wherein M is a transition metal selected from Ti, Hf and Zr; PI is phosphinimine ligands of the formula:

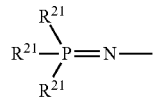

wherein each $R^{21}$ is independently selected from a hydrogen atom; a halogen atom; $C_{1-20}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

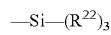

wherein each $R^{22}$ is independently selected from hydrogen, a $C_{1-8}$ alkyl or alkoxy radical, and $C_{6-10}$ aryl or aryloxy radicals; and a germanyl radical of the formula:

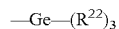

wherein $R^{22}$ is as defined above; and
L is a cyclopentadienyl ligand which is unsubstituted or further substituted by up to three $C_{1-6}$ linear, branched, cyclic or aromatic hydrocarbons, which may be unsubstituted or up to fully substituted with fluorine atoms; supported on an activator of the formula:

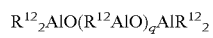

wherein each $R^{12}$ is independently selected from $C_{1-20}$ hydrocarbyl radicals and q is from 3 to 50 to provide a molar ratio of Al from the activator to M from the catalyst from 5:1 to 15:1, or from 5:1 to 10:1.

In a further embodiment, the catalyst has a diameter from 5 to 75 μm.

In a further embodiment, the catalyst has a molar ratio a molar ratio of Al from the activator to M from the catalyst from 5:1 to 10:1.

In a further embodiment, Y is selected from a halogen atom, $C_{1-4}$ alkyl radicals, $C_{6-20}$ aryl radicals, $C_{7-12}$ aryl alkyl radicals, $C_{6-10}$ phenoxy radicals, amido radicals which may be substituted by up to two $C_{1-4}$ alkyl radicals and $C_{1-4}$ alkoxy radicals.

In a further embodiment, L is selected from a cyclopentadienyl type ligand which is substituted by up to three $C_{1-6}$ linear, branched, cyclic or aromatic hydrocarbons which are unsubstituted or up to fully substituted by fluorine atoms. In some embodiments, the cyclopentadienyl type ligand may be a cyclopentadiene ligand, an indenyl ligand or a fluorenyl ligand which may be unsubstituted or substituted with one or more substituents selected from $C_{1-6}$ alkyl radicals and fluorine atoms.

In a further embodiment, each $R^{12}$ is independently selected from $C_{1-10}$ hydrocarbyl radicals.

In a further embodiment, m is 1, n is 1 and p is 2.

In a further embodiment, in the phosphinimine ligand each $R^{21}$ is independently selected from $C_{1-8}$ hydrocarbyl radicals.

In a further embodiment, L is a cyclopentadienyl ligand which is substituted on adjacent carbon atoms with a pentafluorophenyl radical and an n-propyl radical in the 1 and 2 positions.

In a further embodiment, in the phosphinimine ligand each $R^{21}$ is independently selected from $C_{1-4}$ hydrocarbyl radicals.

In a further embodiment, each $R^{21}$ is a tertiary butyl radical.

In a further embodiment, M is Ti.

In a further embodiment, the catalyst is prepared by forming a solution of said catalyst and said activator in a hydrocarbyl solvent in the presence of a surfactant selected from $C_{3-10}$ fluorocarbyl epoxides or alcohols and subsequently dispersing said solution in a $C_{6-12}$ perfluoroalkane diluent without additional surfactant with stirring at a temperature from −15° C. to room temperature to form a stable emulsion and adding a part or all of said emulsion to additional $C_{6-12}$ perfluoroalkane at a temperature greater than 70° C. to precipitate the catalyst as particles wherein the surfactant is present in the solution in an amount from 0.04 to 0.14 moles per unit volume of solvent at a volume ratio of solvent to perfluoroalkane of 0.2.

In a further embodiment, the surfactant is used in an amount from 0.07 to 0.11 moles of surfactant per unit volume of solvent at a volume ratio of solvent to perfluoroalkane of 0.2.

THE CATALYST

Figure 1:
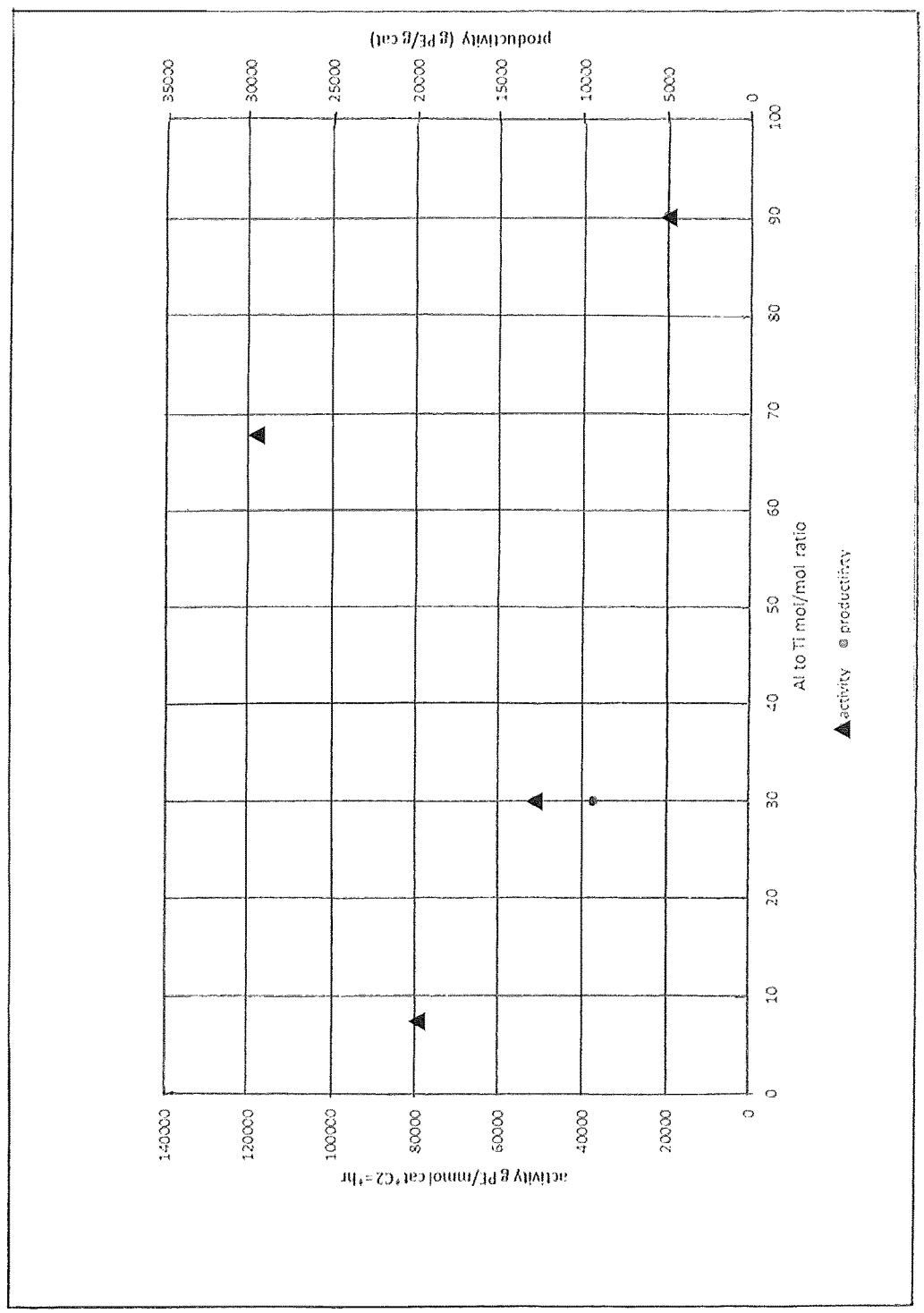
FIG. 1 is a plot of catalyst productivity and activity as a function of the molar ratio of MAO to the self-supported catalyst.

The single site type catalyst comprises a complex of a metal selected from Ti, Zr and Hf, complexed with a cyclopentadienyl type ligand, a phosphinimine ligand and leaving groups.

In some embodiments, the single site catalyst has the formula

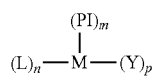

wherein M is selected from Ti, Zr and Hf; PI is a phosphinimine ligand of the formula:

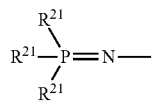

wherein each $R^{21}$ is independently selected from a hydrogen atom; a halogen atom; $C_{1-10}$ hydrocarbyl radicals
L is a monoanionic ligand selected from a cyclopentadienyl-type ligand which is substituted by up to three $C_{1-6}$ linear, branched, cyclic or aromatic hydrocarbons which are unsubstituted or up to fully substituted by fluorine atoms;
Y is independently selected from activatable ligands; m is 1 or 2; n is 0 or 1; p is an integer and the sum of m+n+p equals the valence state of M.

In the catalyst, in one embodiment M is Ti.

In the phosphinimine ligand, in one embodiment, $R^{21}$ is selected from $C_{3-6}$ straight chained or branched alkyl radicals. In one embodiment in the phosphinimine ligand, the $R^{21}$ substituents are within 1 or 2, or 1, carbon atom(s) of each other, or in some embodiments are the same. In some embodiments the $R^{21}$ substituents are branched alkyl radicals, for example tertiary butyl radicals.

In some embodiments, the cyclopentadienyl ligand is a cyclopentadienyl ligand which is substituted by one $C_{2-6}$ linear or branched, alkyl radicals and by a $C_6$ aromatic hydrocarbon which is at least three quarters, or for example fully substituted by fluorine atoms. In some embodiments, the cyclopentadienyl ligand is substituted with a pentafluorophenyl radical and an n-propyl radical which are on adjacent carbon atoms, for example, 1 and 2 positions.

In the catalyst, in some embodiments, Y is selected from a chlorine atom and a $C_{1-4}$ alkyl radical, for example a methyl radical.

The catalyst is activated with an aluminum compound of the formula $$R^{12}_2AlO(R^{12}AlO)_qAlR^{12}_2$$

wherein each $R^{12}$ is independently selected from $C_{1-20}$ hydrocarbyl radicals and q is from 3 to 50 to provide a molar ratio of Al from the activator to M from the catalyst from 10:1 to 500:1. In some embodiments each $R^{12}$ is the same and selected from a $C_{1-4}$ alkyl radical. In some embodiments $R^{12}$ is a methyl radical (i.e. the aluminum compound is methyl aluminoxane cyclic or straight). In some embodiments the molar ratio of Al from the activator to M from the catalyst is from 5:1 to 90:1, or from 5:1 to 75:1 in some embodiments from 5:1 to 10:1.

THE SOLVENT

The solvent for the catalyst is one or more hydrocarbyl compounds. The solvent may be an aromatic solvent such as benzene, toluene or xylene or one or more $C_{4-12}$ paraffin(s) or isoparaffins such as those sold under the trademark ISOPAR® by Exxon. In some embodiments, the solvent is an aromatic solvent, for example toluene. Both catalysts components, the catalyst and the activator must be soluble in the solvent.

THE SURFACTANT

The surfactant is prepared in situ in the solvent by adding to the solvent surfactant precursor (selected from one or more $C_{4-10}$ perfluorocarbons having a terminal hydroxyl group or a terminal oxirane (epoxide) group) and additional activator until there is no more evolution of gas. In some embodiments the molar ratio of activator to surfactant precursor is from 4:1 to 150:1, for example from 10:1 to 35:1.

The activator is the generic aluminum compound (complex) noted above. It may be the same or different from the activator used to activate the catalyst, in one embodiment it is the same. Some precursors for the surfactant may be selected from $C_{6-12}$ perfluorooxiranes. Some oxiranes include perfluorohexane oxirane, perfluoroheptane oxirane perfluorooctane oxirane, perfluorononane oxirane, perfluorodecane oxirane (2,2,3,3,4,4,5,5,6,6,7,7,8,8,9,9,9-heptadecafluoronyl oxirane), perfluoroundecane oxirane.

Assuming the droplets are essentially the same size the volume ratio of solvent to perfluorooxirane/MAO should be about 0.2. One would adjust the surfactant amount accordingly to match the solvent volume.

THE DILUENT

In accordance with the present disclosure, the solvent for the solution of catalyst is insoluble in, or immiscible with, the diluent at the conditions under which the solution and diluents are originally mixed. However, the solvent and diluents are selected so that under different conditions, for example increased temperature, the solvent becomes at least miscible in the diluent. At conditions where the solvent becomes soluble in, or miscible with the diluent, the diluent is no longer a solvent for the catalyst and activator. Further both the solvent and the diluent should not to any significant extent alter the activity of the catalyst and activator.

As noted above representative solvents for the catalyst and activator are hydrocarbons, for example aromatic hydrocarbons, for example $C_6$ aromatic compounds which are unsubstituted or substituted with a $C_{1-4}$ alkyl radical, for example selected from benzene, toluene and xylene, for example toluene.

There are rather a small number of solvents that meet the above listed criteria for the combination of solvent and diluent and the types. Some examples of solvents (or Diluents) that meet the criteria for forming the continuous phase include fluorinated organic solvents, for example perfluorinated organic solvents. Other examples of the above-mentioned solvents (diluents) include perfluorinated (a) hydrocarbons, such as alkanes, alkenes and cycloalkanes, Other examples are perfluorohydrocarbons of e.g. $C_6$-$C_{12}$, such as $C_4$-$C_{10}$. Specific examples of suitable perfluoroalkanes and -cycloalkanes include perfluorohexane, perfluoroheptane, perfluorooctane and perfluoro(methyl-cyclohexane), for example perfluorooctane.

Dispersion

In some embodiments the solution of catalyst, activator and surfactant is prepared at a low temperature, for example from −15° C. to room temperature, or for example from −15° C. to 15° C., or for example from −8° C. to 15° C., or for example from −5° C. to 10° C. The solution is then slowly added to warm diluent at a temperature from about 70° C. to 90° C. with stirring). The cool solution is dispersed in the diluent under stirring at a temperature from 000° C. to 15° C. and an emulsion forms. In some embodiments, the emulsion is discharged into additional diluent at a temperature from 70° C. to 90° C. with stirring. The catalyst initially being in the dispersed phase precipitates from the dispersion (i.e. when dried) as a spherical particle diameter for example from 5 to 200 μm, for example from 10 to 50 μm.

Precipitation

As the dispersed phase of the emulsion formed above is discharged with stirring into a receiving vessel that contains hot diluent, the solvent becomes miscible in the diluent and the "micelles" of catalyst and activator precipitate out of the dispersion. The precipitated catalyst and activator may be separated from the diluent and solvent by conventional means such filtration or decanting followed by drying under an inert atmosphere (e.g. such as passing dry nitrogen through the precipitate).

Polymerization

Gas Phase Polymerization

In some embodiments fluidized bed gas phase reactors to make polyethylene are operated at low temperatures from about 50° C. up to about 120° C. (provided the sticking temperature of the polymer is not exceeded) for example from about 75° C. to about 110° C. and at pressures not exceeding, for example, 3,447 kPa (about 500 psi), and is some examples not greater than about 2,414 kPa (about 350 psi).

Gas phase polymerization of olefins is well known. In some embodiments in the gas phase polymerization of olefins (such as ethylene) a gaseous feed stream comprising of at least about 80 weight % ethylene and the balance one or more $C_{3-6}$ copolymerizable monomers for example, 1-butene, or 1-hexene or both, together with a ballast gas such as nitrogen, optionally a small amount of $C_{1-2}$ alkanes (i.e. methane and ethane) and further optionally a molecular weight control agent (for example hydrogen) is fed to a reactor and in some cases a condensable hydrocarbon (e.g. a $C_{4-6}$ alkane such as pentane). In some embodiments the feed stream passes through a distributor plate at the bottom of the reactor and vertically traverses a bed of polymer particles with active catalyst, for example a fluidized bed; but, also contemplated are stirred bed reactors. A small proportion of the olefin monomers in the feed stream react with the catalyst. The unreacted monomer and the other non-polymerizable components in the feed stream exit the bed and typically enter a disengagement zone where the velocity of the feed stream is reduced so that entrained polymer falls back into the fluidized bed. In some embodiments the gaseous stream leaving the top of the reactor is then passed through a compressor. The compressed gas is then cooled by passage through a heat exchanger to remove the heat of reaction. The heat exchanger may be operated at temperatures below about 65° C., for example at temperatures from 20° C. to 50° C. If there is a condensable gas it is usually condensed and entrained in the recycle stream to remove heat of reaction by vaporization as it recycles through the fluidized bed.

Polymer is removed from the reactor through a series of vessels in which monomer is separated from the off gases. The polymer is recovered and further processed. The off gases are fed to a monomer recovery unit. The monomer recovery unit may be selected from those known in the art including a distillation tower (i.e. a $C_2$ splitter), a pressure swing adsorption unit and a membrane separation device. Ethylene and hydrogen gas recovered from the monomer recovery unit are fed back to the reactor. Finally, make up feed stream is added to the reactor below the distributor plate.

Slurry Polymerization

Slurry processes are conducted in the presence of a hydrocarbon diluent such as an alkane (including isoalkanes), an aromatic or a cycloalkane. The diluent may also be the alpha olefin comonomer used in copolymerizations. Representative alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is in some embodiments from about 5° C. to about 130° C., or for example less than about 110° C. or for example from about 10° C. to 80° C. The reaction temperature is selected so that the ethylene copolymer is produced in the form of solid particles. The reaction pressure is influenced by the choice of diluent and reaction temperature. For example, pressures may range from 15 to 45 atmospheres (about 220 to 660 psi or about 1,500 to about 4,600 KPa) when isobutane is used as diluent (see, for example, U.S. Pat. No. 4,325,849) to approximately twice that (i.e. from 30 to 90 atmospheres—about 440 to 1,300 psi or about 3,000-9,100 kPa) when propane is used (see U.S. Pat. No. 5,684,097). The pressure in a slurry process must be kept sufficiently high to keep at least part of the ethylene monomer in the liquid phase.

In some embodiments, the reaction takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

The slurry reaction may also be conducted in a continuous stirred tank reactor.

THE POLYMER

The polymer resulting polymer may comprise from 80 to 99, for example, from about 90 to 98 weight % of ethylene and from 20 to 1, for example from 10 to 2 weight % of one or $C_{4-8}$ alpha olefins. The polymer may have a density from 0.90 to 0.955, or for example from 0.910 to 0.945 g/cc.

Applications

The resulting polymer is useful in a number of application including blown and cast film, and injection molding.

EXAMPLES

The present invention will now be illustrated by the following non limiting examples.

Reagents

Toluene was purchased from Aldrich and further purified through a series of alumina and molecular sieves columns. It was stored in the glovebox in Nalgene bottles containing 13× molecular sieves to dry (99.9% purity). 30 wt % methylaluminoxane in toluene was obtained from Albermarle (13.53 wt % Al based on the certificate of analysis. The pyrosafe was brought into the glovebox and a small quantity was transferred to a hypovial prior to use. 2,2,3,3, 4,4,5,5,6,6,7,7,8,8,9,9,9-heptadecafluoronyl oxirane (96%) was obtained from Sigma Aldrich and stored under a nitrogen atmosphere in the glovebox. Used as received.

Perfluorooctane (98%) was obtained from Sigma-Aldrich and was degassed for 30 minutes under nitrogen atmosphere and stored over 13× molecular sieves under nitrogen atmosphere in the glove box.

Tri-isobutylaluminum (TIBAL) was purchased from AkzoNobel. TIBAL has a boiling point of 86° C. and a density of 0.786 g/mL 1-hexene.

Ethylene was purchased from Praxair as polymer grade. The ethylene was purified and dried by passing the gas through a series of purification beds including alumina (brand: Selexsorb® COS), molecular sieve (type: 13X), and a deoxygenation bed (brand: Oxiclear®).

Purchased 1-hexene from Praxair was dried by storing a 1-liter batch over 3A molecular sieves. $(nBuCp)_2HfCl_2$ was purchased from Wako Chemicals with product#324-39261. The compound was benzylated in house to make $(nBuCp)_2HfBz_2$.

The Catalyst (1-n-propyl-2-pentafluoro cyclopentadiene)(tri-tert-butyl)phoshinimine titanium dichloride The catalyst molecule was prepared in house by reacting 1-pentafluoro,3-timethyl silyl cyclopentadiene in tetrahydrofuran (THF) at 0° C. with butyl lithium and 1-bromo isopropane which was allowed to rise to room temperature to yield 1-propane, 2-pentfluorophenyl cyclopentadiene which was separated from the THF and subsequently reacted in toluene with titanium tetrachloride at 90° C. to yield 1-propyl, 2-pentafluorophenyl,cyclopentadienyl titanium tri chloride. The tri chloride was subsequently reacted trimethylsilyl-triisobutylphoshinimine to yield the catalyst.

Example 1—Inventive Catalysts

General Procedure for Making Self-Supported Catalyst

Two hypovials of 30 wt % MAO in toluene (2.185 g, 10.6 mmol Al) and a solution of 2,2,3,3,4,4,5,5,6,6,7,7,8,8,9,9,9-heptadecafluoronyl oxirane (74 mg, 0.155 mmol) in toluene (0.502 g) were cooled in a −45° C. freezer for one hour. The oxirane solution was then added dropwise to one of the MAO hypovials and stirred with a stir bar for half an hour. A solution of the catalyst molecule (0.149 g, 0.245 mmol) in toluene (1.237 g) was added to the second hypovial of 30 wt % MAO in toluene and then stirred for half an hour with a stir bar. The oxirane/MAO solution was then added dropwise to the XE334/MAO solution, and stirred for a further hour.

The mixture was transferred to a Wilmad double walled reactor using 40 mL perfluorooctane. Equipped with a double bladed stir rod and an overhead stirrer, the mixture was slowly ramped up to 500 rpm at a rate of 20-30 rpm per minute. At 350 rpm cooling was introduced using a chilled oil pump to main the reaction temperature at −15° C. The emulsion was stirred and stabilized for 10 minutes at 500 rpm.

In a 3-necked round bottom flask, 120 mL perfluorooctane was heated to 94° C. while stirring at 300 rpm. Portions of the emulsion were added in 5-10 mL increments to the perfluorooctane via plastic tubing and an adaptor. Between additions, the solution in the receiving flask was reheated to 90° C. After all additions were complete, the product was stirred for half an hour. The perfluorooctane was then decanted and the particles were dried via heat (95° C.) and $N_2$ air flow. The solid was then ground and sieved resulting in 0.260 g of fine yellow powder. Total Ti 0.409 wt %

TABLE 1

Catalysts with Different Al to Ti Ratios

| Catalyst ID | Al/Ti Ratio | Oxirane (mg) | Catalyst Loading (mmol Ti/g cat) |
|---|---|---|---|
| Catalyst 1 | 90 | 74 | 0.157 |
| Catalyst 2 | 67.5 | 73 | 0.202 |
| Catalyst 3 | 30 | 73 | 0.362 |
| Catalyst 4 | 7.5 | 72 | 0.735 |
| Comparative Catalyst 1A | 90 | 55 | 0.160 |
| Comparative Catalyst 1B | 90 | 37 | 0.162 |
| Comparative Catalyst 4A | 7.5 | 0 | 0.647 |

Comparative Examples

A metallocene catalyst (n-butyl cyclopentadieneyl)$_2$Zr (benzyl)$_2$ was used in comparative examples. Two catalyst were prepared as described above one having a molar ration of AL:Zr of 15:1, the other having a molar ratio of Al:Zr of 200:1.

TABLE 2

Comparative Catalyst A and B

| Catalyst ID | Al/Ti Ratio | Catalyst Loading (mmol Ti/g cat) |
|---|---|---|
| Catalyst A | 15 | 0.587 |
| Catalyst B | 200 | 0.077 |

Polymerization

The Bench Scale Reactor (BSR) was a 2 L autoclave semi batch reactor operating in the gas phase. The reactor is initially pre-conditioned at 110° C. for approximately 30 minutes. Salt (NaCl, 160 g) is then added to the reactor which is then subsequently purged four times with 200 psi of nitrogen and once with 200 psi ethylene. 2 mL of 1-hexene is added as a pre-charger along with 0.5 mL of TiBAL which is then followed by the cooling of the reactor to 90° C. The 2-50 mg of offline catalysts, which were pre-loaded into the catalyst tube in the glovebox, is then pushed into the reactor using ethylene pressure. The ethylene feed stream delivery was continuous to maintain the set reactor pressure. The reactor was equipped with impeller stirrers that spin at approximately 525 rpm to provide reactor mixing. A usual polymerization experiment is conducted for approximately 1 hour.

At the conclusion of the polymerization, cooling water was turned on and the ethylene was slowly vented from the reactor. The reactor was then purged with nitrogen. The reactor was then opened so that the reactor contents, the reactor appearance and the polymer could be observed. The polymer was removed and then weighed. All the catalysts were tested on the polymerization reactor and productivities of the catalysts are captured in the Table 3 and 4.

TABLE 3

Polymerization Performance with Catalysts with Different Al to Ti Ratios

| Catalyst ID | Al/Ti ratio | Oxirane (mg) | Catalyst loading (mmol Ti/g cat) | Activity (gPE/{(mmoL M)[C2=](hr)}) | Productivity (g PE/g Cat) |
|---|---|---|---|---|---|
| Catalyst 1 | 90 | 74 | 0.157 | 20026 | 1586 |
| Catalyst 2 | 67.5 | 73 | 0.202 | 117799 | 12000 |
| Catalyst 3 | 30 | 73 | 0.362 | 51714 | 9441 |
| Catalyst 4 | 7.5 | 72 | 0.735 | 79764 | 29565 |
| Comparative catalyst 1A | 90 | 55 | 0.160 | 26170 | 2112 |
| Comparative catalyst 1B | 90 | 37 | 0.162 | 40560 | 3314 |
| Comparative catalyst 4A | 7.5 | 0 | 0.647 | 183277 | 59800 |

The data from Table 3 was plotted in FIG. 1. FIG. 1 shows at the molar ratio of Al to metal in the catalyst from 5/1 to 90/1, the catalyst activity is generally acceptable and peaks at around 67.5/1; whereas the catalyst productivity is linear and reversed compared to FIG. 2.

TABLE 4

Polymerization performance with Comparative Catalysts

| Catalyst ID | Al/Ti Ratio | Catalyst Loading (mmol Ti/g cat) | Activity (gPE/{(mmoL M)[C2=](hr)}) | Productivity (g PE/g Cat) |
|---|---|---|---|---|
| Catalyst A | 15 | 0.587 | 6675 | 1838 |
| Catalyst B | 200 | 0.077 | 411137 | 15965 |

The data shows for the comparative catalyst A at mol ratios of Al:active metal site in the catalyst of 15:1 the activity and productivity is too low for commercialization of the catalyst. It is believed the phosphinimine catalyst is more oxophillic than the conventional metallocene catalyst due to the presence and proximity of the phosphorous and nitrogen atom. This enhances the alkylation reaction of the phosphinimine catalyst dichloride to lead to a higher activity.

Comparative Data

Figure 2:
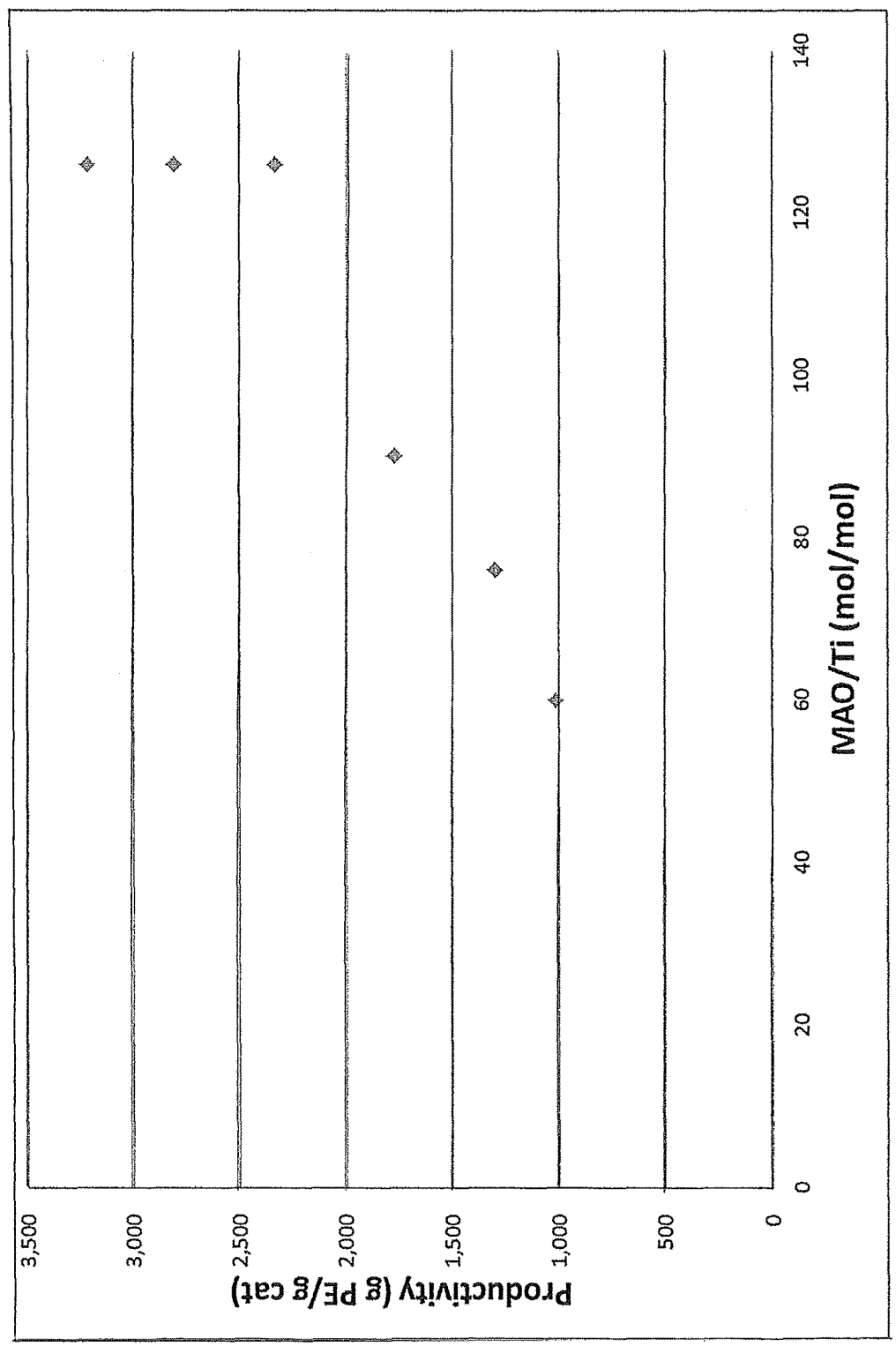
FIG. 2 is a plot of the conventional trend of catalyst productivity as a function of the molar ratio of MAO to the catalyst on an inert support.

Applicant reviewed its data base of the productivity of the same catalyst supported on a clay support and activated with different amounts of MAO and therefor a having different molar ratios of Al:Ti. The data is presented in FIG. 2, shows a fairly conventional trend in productivity of catalyst on inert supports. At ratios of less than about 100:1 the productivity is too low to be commercially acceptable.

What is claimed is:

1. A spherical self supported single site catalyst having a diameter from 5 to 200 μm comprising a catalyst of the formula

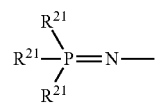

wherein M is a transition metal selected from Ti, Hf and Zr; PI is a phosphinimine ligands of the formula:

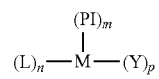

wherein each $R^{21}$ is independently selected from a hydrogen atom; a halogen atom; C1-20, hydrocarbyl radicals which are unsubstituted by or further substituted by a halogen atom; a C1-8 alkoxy radical; a $C_{6-10}$ aryl or aryloxy radical; an amido radical; a silyl radical of the formula:

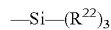

wherein each $R^{22}$ is independently selected from hydrogen, a Ci-8 alkyl or alkoxy radical, and C6-10 aryl or aryloxy radicals; and a germanyl radical of the formula:

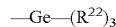

wherein $R^{22}$ is as defined above;

L is a monoanionic ligand selected from a cyclopentadienyl ligand which is substituted by up to three $C_{1-6}$ linear, branched, cyclic or aromatic hydrocarbons which are unsubstituted or up to fully substituted by fluorine atoms; and Y is independently selected from a halogen atom, $C_{1-4}$ alkyl radicals, $C_{6-20}$ aryl radicals, $C_{7-12}$ arylalkyl radicals, $C_{6-10}$ phenoxy radicals, amido radicals which is optionally substituted by up to two $C_{1-4}$ alkyl radicals and $C_{1-4}$ alkoxy radicals; m is 1 or 2; n is 0 or 1; p is an integer and the sum of m+n+p equals the valence state of M;

supported on an activator of the formula:

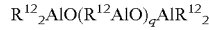

wherein each $R^{12}$ is independently selected from $C_{1-20}$ hydrocarbyl radicals and q is from 3 to 50 to provide a molar ratio of Al from the activator to M from the catalyst from 5:1 to 90:1.

2. The catalyst according to claim 1, having a diameter from 5 to 75 µm.

3. The catalyst according to claim 1, having a molar ratio a molar ratio of Al from the activator to M from the catalyst from 5:1 to 75:1.

4. The catalyst according to claim 3, having a molar ratio a molar ratio of Al from the activator to M from the catalyst from 5:1 to 30:1.

5. The catalyst according to claim 4, wherein the molar ratio of molar ratio of Al from the activator to M from the catalyst from 5:1 to 10:1.

6. The catalyst according to claim 1, wherein Y is selected from a chlorine atom and $C_{1-4}$ alkyl radicals.

7. The catalyst according to claim 1, wherein L is selected from a cyclopentadienyl ligand which is substituted by up to three $C_{1-6}$ linear, branched, cyclic or aromatic hydrocarbons which are unsubstituted or up to fully substituted by fluorine atoms.

8. The catalyst according to claim 1, wherein in the activator wherein each $R^{12}$ is independently selected from $C_{1-8}$ hydrocarbyl radicals.

9. The catalyst according to claim 1, wherein m is 1, n is 1 and p is 2.

10. The catalyst according to claim 1, wherein in the phosphinimine ligand each $R^{21}$ is independently selected from $C_{1-10}$ hydrocarbyl radicals.

11. The catalyst according to claim 10, wherein in the phosphinimine ligand each $R^{21}$ is independently selected from $C_{1-4}$ hydrocarbyl radicals.

12. The catalyst according to claim 11, wherein in the phosphinimine ligand each $R^{21}$ is a tertiary butyl radical.

13. The catalyst according to claim 1, wherein L is a cyclopentadienyl ligand substituted on adjacent carbon atoms with a pentafluorophenyl radical and an n-propyl radical at the 1 and 2 positions.

* * * * *